United States Patent
Bronicki (10) Patent No.: US 9,388,797 B2
(45) Date of Patent: Jul. 12, 2016

(54) METHOD AND APPARATUS FOR PRODUCING POWER FROM GEOTHERMAL FLUID

(75) Inventor: Lucien Y. Bronicki, Yavne (IL)

(73) Assignee: ORMAT TECHNOLOGIES, INC., Reno, NV (US)

( * ) Notice: Subject to any disclaimer, the term of this patent is extended or adjusted under 35 U.S.C. 154(b) by 146 days.

(21) Appl. No.: 13/617,890

(22) Filed: Sep. 14, 2012

(65) Prior Publication Data

US 2014/0075938 A1    Mar. 20, 2014

(51) Int. Cl.
*F01K 27/00* (2006.01)
*F03G 7/00* (2006.01)
*F03G 7/04* (2006.01)

(52) U.S. Cl.
CPC .. *F03G 7/00* (2013.01); *F03G 7/04* (2013.01); *Y02E 10/10* (2013.01)

(58) Field of Classification Search
CPC ......... F01D 15/10; F01K 23/04; F01K 25/08; F01K 25/10; F03G 6/003; F03G 7/00; F03G 7/04; Y02E 10/10; Y02E 20/16
USPC ............. 60/641.2, 641.5, 646, 651, 653, 655, 60/656, 671, 676, 677, 679, 691; 165/85
See application file for complete search history.

(56) References Cited

U.S. PATENT DOCUMENTS

| | | | | |
|---|---|---|---|---|
| 3,757,516 A | * | 9/1973 | McCabe | F01K 25/08 60/641.2 |
| 4,026,111 A | * | 5/1977 | Matthews | 60/641.5 |
| 4,364,232 A | * | 12/1982 | Sheinbaum | 60/641.2 |
| 4,512,155 A | * | 4/1985 | Sheinbaum | 60/641.2 |
| 4,578,953 A | | 4/1986 | Krieger et al. | |
| 4,700,543 A | | 10/1987 | Krieger et al. | |
| 4,996,846 A | * | 3/1991 | Bronicki | 60/641.2 |
| 5,531,073 A | | 7/1996 | Bronicki et al. | |
| 5,664,419 A | * | 9/1997 | Kaplan | 60/641.2 |
| 5,671,601 A | * | 9/1997 | Bronicki et al. | 60/641.5 |
| 5,809,782 A | * | 9/1998 | Bronicki et al. | 60/641.2 |
| 5,839,282 A | * | 11/1998 | Bronicki et al. | 60/641.5 |
| 7,775,045 B2 | | 8/2010 | Kaplan et al. | |
| 7,797,940 B2 | | 9/2010 | Kaplan | |
| 8,193,659 B2 | | 6/2012 | Bronicki et al. | |
| 8,667,799 B2 | | 3/2014 | Batscha | |
| 2004/0040303 A1 | * | 3/2004 | Amir | 60/641.2 |
| 2006/0026961 A1 | * | 2/2006 | Bronicki | 60/641.2 |
| 2006/0196187 A1 | * | 9/2006 | Zimron et al. | 60/651 |
| 2008/0060357 A1 | * | 3/2008 | Zimron et al. | 60/651 |
| 2010/0242474 A1 | * | 9/2010 | Berger et al. | 60/641.2 |

\* cited by examiner

*Primary Examiner* — Audrey K Bradley
*Assistant Examiner* — Daniel Wagnitz
(74) *Attorney, Agent, or Firm* — Nath, Goldberg & Meyer; Jerald L. Meyer (57) ABSTRACT

A method for producing power from geothermal fluid includes: separating the geothermal fluid in a flash tank into geothermal vapor comprising steam and non-condensable gases, and geothermal brine; supplying the geothermal vapor to a vaporizer; vaporizing a preheated motive fluid in the vaporizer using heat from the geothermal vapor to produce heat-depleted geothermal vapor and vaporized motive fluid, wherein the heat content in the geothermal vapor exiting the flash tank is only enough to vaporize the preheated motive fluid in the vaporizer; expanding the vaporized motive fluid in a vapor turbine producing power and expanded vaporized motive fluid; condensing the expanded vaporized motive fluid in a condenser to produce condensed motive fluid; and preheating the condensed motive fluid in a preheater using heat from the heat-depleted geothermal vapor and the geothermal brine, thereby producing the preheated motive fluid, make-up water and heat-depleted geothermal brine.

12 Claims, 4 Drawing Sheets

FIG. 1 (LOW TEMP.)

FIG. 2 (MED. TEMP)

FIG. 3 (HIGH TEMP.)

FIG. 4 (HIGH TEMP. W/STEAM)

METHOD AND APPARATUS FOR PRODUCING POWER FROM GEOTHERMAL FLUID

TECHNICAL FIELD

The present subject matter relates to a method and apparatus for producing power from a geothermal fluid. In particular, the present subject matter relates to using a two-phase geothermal fluid to generate power in a Rankine cycle power plant utilizing a motive fluid.

BACKGROUND

Geothermal power plants utilizing a two-phase geothermal fluid source are generally known. In the known geothermal power plants, the geothermal fluid includes a mixture of saturated steam and brine, and the working fluid for the power plant may be an organic fluid. In such a plant, a separator divides the geothermal fluid into a branch containing steam, and a branch containing brine. The steam is applied to a vaporizer containing an organic fluid that is vaporized by the steam which is cooled as a result, producing steam condensate. The cooled steam can be combined with the brine produced by its separator and applied to a preheater which serves to preheat the liquid organic fluid supplied to the vaporizer.

The organic vapor produced by the vaporizer is applied to a turbogenerator wherein the vapor expands producing electricity and heat-depleted vaporized organic fluid. A condenser condenses the vaporized organic fluid producing condensate that is pumped back into the vaporizer through the preheater.

Typically, the minimum exit temperature of the brine from the preheater is limited by the minerals, chiefly silica, in the brine. This limits the amount of sensible heat that can be transferred from the brine to the liquid organic fluid in the preheater in order to prevent precipitation of the minerals in the brine. As a result, the exit temperature of the brine limits the power that the turbogenerator can produce. Furthermore, the amount of heat available in the steam usually exceeds the amount of heat needed to vaporize the organic fluid with the result that a significant amount of heat available in the geothermal fluid is not utilized. This is particularly true when organic fluids are used in sub-critical power cycles.

Therefore, there remains a need to provide a new and improved method of and apparatus for producing power using a two-phase geothermal fluid whereby the method and apparatus optimize the use of the heat found in both phases of the two-phase geothermal fluid extracted from a production well.

BRIEF SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present subject matter is directed to a method for producing power from geothermal fluid containing non-condensable gases produced by a geothermal production well, the method comprising: separating said geothermal fluid in a flash tank into geothermal vapor comprising steam and non-condensable gases, and geothermal brine; supplying said geothermal vapor to a vaporizer; vaporizing a preheated motive fluid in the vaporizer using heat from said geothermal vapor to produce heat-depleted geothermal vapor and vaporized motive fluid, wherein the heat content in the geothermal vapor exiting said flash tank is only enough to vaporize said preheated motive fluid in the vaporizer; expanding said vaporized motive fluid in a vapor turbine producing power and expanded vaporized motive fluid; condensing said expanded vaporized motive fluid in a condenser to produce condensed motive fluid; and preheating said condensed motive fluid in a preheater using heat from said heat-depleted geothermal vapor and said geothermal brine, thereby producing said preheated motive fluid, make-up water and heat-depleted geothermal brine.

Another aspect of the present subject matter is directed to a method for producing power from geothermal fluid containing non-condensable gases produced by a geothermal production well, the method comprising: separating said geothermal fluid in a flash tank into geothermal vapor comprising steam and non-condensable gases, and geothermal brine; expanding said geothermal vapor in a steam turbine connected to a generator, producing power and expanded geothermal vapor; supplying said expanded geothermal vapor to a vaporizer; vaporizing a preheated motive fluid in the vaporizer using heat from said expanded geothermal vapor to produce heat-depleted geothermal vapor and vaporized motive fluid, wherein the heat content in the expanded geothermal vapor exiting said steam turbine is essentially only enough to vaporize said preheated motive fluid in the vaporizer; expanding said vaporized motive fluid in a vapor turbine connected to a generator, producing power and expanded vaporized motive fluid; condensing said expanded vaporized motive fluid in a condenser to produce condensed motive fluid; and preheating said condensed motive fluid in a preheater using heat from said heat-depleted geothermal vapor and said geothermal brine, thereby producing said preheated motive fluid, make-up water and heat-depleted geothermal brine.

A further aspect of the present subject matter is drawn to a method for producing power from geothermal fluid containing non-condensable gases produced by a geothermal production well, the method comprising: separating said geothermal fluid in a first flash tank into geothermal vapor comprising steam and non-condensable gases, and geothermal brine; separating said geothermal brine in a second flash tank into further geothermal vapor comprising steam and non-condensable gases, and further geothermal brine; expanding said geothermal vapor in a steam turbine connected to a generator, producing power and expanded geothermal vapor; expanding said further geothermal vapor in an intermediate stage of said steam turbine, producing power and expanded geothermal vapor; supplying said expanded geothermal vapor to a vaporizer; vaporizing a preheated motive fluid in the vaporizer using heat from said expanded geothermal vapor to produce heat-depleted geothermal vapor and vaporized motive fluid, wherein the heat content in the expanded geothermal vapor exiting said steam turbine is essentially only enough to vaporize said preheated motive fluid in the vaporizer; expanding said vaporized motive fluid in a vapor turbine connected to a generator, producing power and expanded vaporized motive fluid; condensing said expanded vaporized motive fluid in a condenser to produce condensed motive fluid; and preheating said condensed motive fluid in a preheater using heat from said heat-depleted geothermal vapor and said geothermal brine, thereby producing said preheated motive fluid, make-up water and heat-depleted geothermal brine.

A still further aspect of the present subject matter is directed to a power plant operating on geothermal fluid for producing electric power comprising: a flash tank for separating said geothermal fluid into geothermal vapor comprising steam and non-condensable gases, and geothermal brine; a vaporizer for receiving said geothermal vapor and vaporizing a preheated motive fluid using heat from said geothermal vapor to produce heat-depleted geothermal vapor and vaporized motive fluid, wherein said flash tank is configured to produce geothermal vapor containing a heat content only enough to vaporize said preheated motive fluid in the vaporizer; a vapor turbine for receiving and expanding said vaporized motive fluid, producing power and expanded vaporized motive fluid; a condenser for receiving and condensing said expanded vaporized motive fluid to produce condensed motive fluid; and a preheater receiving said condensed motive fluid, said heat-depleted geothermal vapor and said geothermal brine, said preheater heating said condensed motive fluid using heat from said heat-depleted geothermal vapor and said geothermal brine, thereby producing said preheated motive fluid, make-up water and heat-depleted geothermal brine.

A yet further aspect of the present subject matter includes a power plant operating on geothermal fluid for producing electric power comprising: a flash tank for separating said geothermal fluid into geothermal vapor comprising steam and non-condensable gases, and geothermal brine; a steam turbine connected to a generator for receiving and expanding said geothermal vapor, producing power and expanded geothermal vapor; a vaporizer for receiving said expanded geothermal vapor and vaporizing a preheated motive fluid using heat from said expanded geothermal vapor to produce heat-depleted geothermal vapor and vaporized motive fluid, wherein said flash tank and said steam turbine are configured to produce expanded geothermal vapor containing a heat content only enough to vaporize said preheated motive fluid in the vaporizer; a vapor turbine for receiving and expanding said vaporized motive fluid, producing power and expanded vaporized motive fluid; a condenser for receiving and condensing said expanded vaporized motive fluid to produce condensed motive fluid; and a preheater receiving said condensed motive fluid, said heat-depleted geothermal vapor and said geothermal brine, said preheater heating said condensed motive fluid using heat from said heat-depleted geothermal vapor and said geothermal brine, thereby producing said preheated motive fluid, make-up water and heat-depleted geothermal brine.

Another aspect of the present subject matter is drawn to a power plant operating on geothermal fluid for producing electric power comprising: a first flash tank for separating said geothermal fluid into geothermal vapor comprising steam and non-condensable gases, and geothermal brine; a second flash tank for separating said geothermal brine into further geothermal vapor comprising steam and non-condensable gases, and heat-depleted geothermal brine; a steam turbine comprising multiple stages and connected to a generator for receiving and expanding said geothermal vapor and said further geothermal vapor, producing power and expanded geothermal vapor; a vaporizer for receiving said expanded geothermal vapor and vaporizing a preheated motive fluid using heat from said expanded geothermal vapor to produce heat-depleted geothermal vapor and vaporized motive fluid, wherein said flash tank and said steam turbine are configured to produce expanded geothermal vapor containing a heat content only enough to vaporize said preheated motive fluid in the vaporizer; a vapor turbine for receiving and expanding said vaporized motive fluid, producing power and expanded vaporized motive fluid; a condenser for receiving and condensing said expanded vaporized motive fluid to produce condensed motive fluid; and a preheater receiving said condensed motive fluid, said heat-depleted geothermal vapor and said heat-depleted geothermal brine, said preheater heating said condensed motive fluid using heat from said heat-depleted geothermal vapor and said heat-depleted geothermal brine, thereby producing said preheated motive fluid, make-up water and further heat-depleted geothermal brine.

A yet further aspect of the present subject matter is directed to a method for producing power from geothermal fluid containing non-condensable gases produced by a geothermal production well, the method comprising: separating said geothermal fluid in a first flash tank into geothermal vapor comprising steam and non-condensable gases, and geothermal brine; supplying said geothermal vapor to a first vaporizer; vaporizing a preheated motive fluid in the first vaporizer using heat from said geothermal vapor to produce heat-depleted geothermal vapor and vaporized motive fluid, wherein the heat content in the geothermal vapor exiting said first flash tank is only enough to vaporize said preheated motive fluid in the first vaporizer; expanding said vaporized motive fluid in a first vapor turbine producing power and expanded vaporized motive fluid; condensing said expanded vaporized motive fluid in a first condenser to produce condensed motive fluid; preheating said condensed motive fluid in a first preheater using heat from said heat-depleted geothermal vapor and said geothermal brine, thereby producing said preheated motive fluid, make-up water and heat-depleted geothermal brine; separating said heat-depleted geothermal brine in a second flash tank into lower-temperature geothermal vapor comprising lower-temperature steam and non-condensable gases, and further heat-depleted geothermal brine; supplying said lower-temperature geothermal vapor to a second vaporizer; vaporizing a preheated second motive fluid in the second vaporizer using heat from said lower-temperature geothermal vapor to produce second heat-depleted geothermal vapor and vaporized second motive fluid, wherein the heat content in the lower-temperature geothermal vapor exiting said second flash tank is only enough to vaporize said preheated second motive fluid in the second vaporizer; expanding said vaporized second motive fluid in a second vapor turbine producing power and expanded second vaporized motive fluid; condensing said expanded second vaporized motive fluid in a second condenser to produce condensed second motive fluid; and preheating said condensed second motive fluid in a second preheater using heat from said second heat-depleted geothermal vapor and said heat-depleted geothermal brine, thereby producing said preheated second motive fluid, further make-up water and further heat-depleted geothermal brine.

BRIEF DESCRIPTION OF THE DRAWINGS

Non-limiting embodiments of the present subject matter are described with respect to the accompanying drawings, wherein.

DETAILED DESCRIPTION

Overview

The present subject matter relates to the optimization of latent heat and sensible heat in a two-phase geothermal fluid, namely a geothermal fluid containing a geothermal vapor component (comprising geothermal steam and non-condensable gases) and a geothermal liquid or geothermal brine component. Latent heat is often described as the heat released or absorbed by a body or a thermodynamic system during a process that occurs without a change in temperature. In a typical example, the temperature of the body remains constant, but the body undergoes a phase transition, from liquid to gas (boiling) or from liquid to solid (freezing) at a constant temperature. Sensible heat, on the other hand, is often described as heat exchanged by a body or thermodynamic system in which the only effect is a temperature change. A typical example involving sensible heat might include heating water from 10° C. to 20° C.

In an ideal power plant, the heat present in the geothermal steam component of the two-phase geothermal fluid heat sources is transferred from the geothermal steam to a motive fluid or a working fluid, for example an organic fluid, in a vaporizer containing the motive fluid. Except for the presence of non-condensable gases trapped in the geothermal steam, which adversely affect heat transfer, all of the heat transferred to the motive fluid is derived from the latent heat in the geothermal steam. Thus, the temperature of the geothermal steam remains essentially constant.

Prior to reaching its boiling point temperature, sensible heat needs to be added to the motive fluid in order raise its temperature. The sensible heat added to the motive fluid is a considerable percentage of the total heat supplied to the motive fluid in order to reach the boiling point temperature. In prior art systems, the sensible heat needed to reach the boiling point temperature can be supplied by the latent heat in the geothermal steam.

After the boiling point of the motive fluid is reached, the latent heat of vaporization of the motive fluid is supplied by the latent heat of the steam as vaporization of the motive fluid commences. During this phase transition, a greater amount of heat in the geothermal steam is transferred to the motive fluid than during the heating phase.

Turning now to the heat present in the geothermal brine, all of the heat transferred from the geothermal brine to a motive fluid is sensible heat; and as a consequence, the temperature of the geothermal brine drops as the temperature of the motive fluid increases. In this case, the motive fluid is preheated by the geothermal brine as the latter is cooled in the process. After the temperature of the motive fluid reaches the boiling point, the temperature remains constant. During this phase, if the only heat source is the geothermal brine, the latent heat of vaporization of the motive fluid is supplied by sensible heat in the geothermal brine. Consequently, the maximum temperature of the motive fluid when the heat source is geothermal brine will be less than that available when the source is geothermal steam.

In a steam-based power plant, the preheat portion of the operation is carried out very inefficiently from an energy standpoint, and in a water-based power plant, the boiling portion of the operation is carried out inefficiently, the result is that the overall operation of both power plants is not efficient. The present subject matter uses both the geothermal steam and geothermal brine components of the geothermal fluid in a single system. In other words, the geothermal steam component is used under conditions that maximize the amount of heat extracted from the geothermal steam under optimum conditions of thermodynamic efficiency (that is, the latent heat of vaporization of the motive fluid during its boiling phase is supplied by latent heat in the geothermal steam component), and the geothermal brine component is used under conditions that effectively maximize the amount of heat extracted from the geothermal brine under optimum efficiency conditions (that is, sensible heat in the working fluid during its pre-heat phase is supplied by sensible heat in the water component).

Additionally, after the latent heat from in the geothermal steam has been exhausted, the geothermal steam condenses and contains sensible heat as hot water (or make-up water). The present subject matter further contemplates the use of the sensible heat in the geothermal steam condensate to aid in preheating the motive fluid.

Further aspects of the present subject matter will be discussed in detail with respect to the specific non-limiting embodiments as shown in FIGS. 1-4.

Non-Limiting Embodiments

Figure 1:
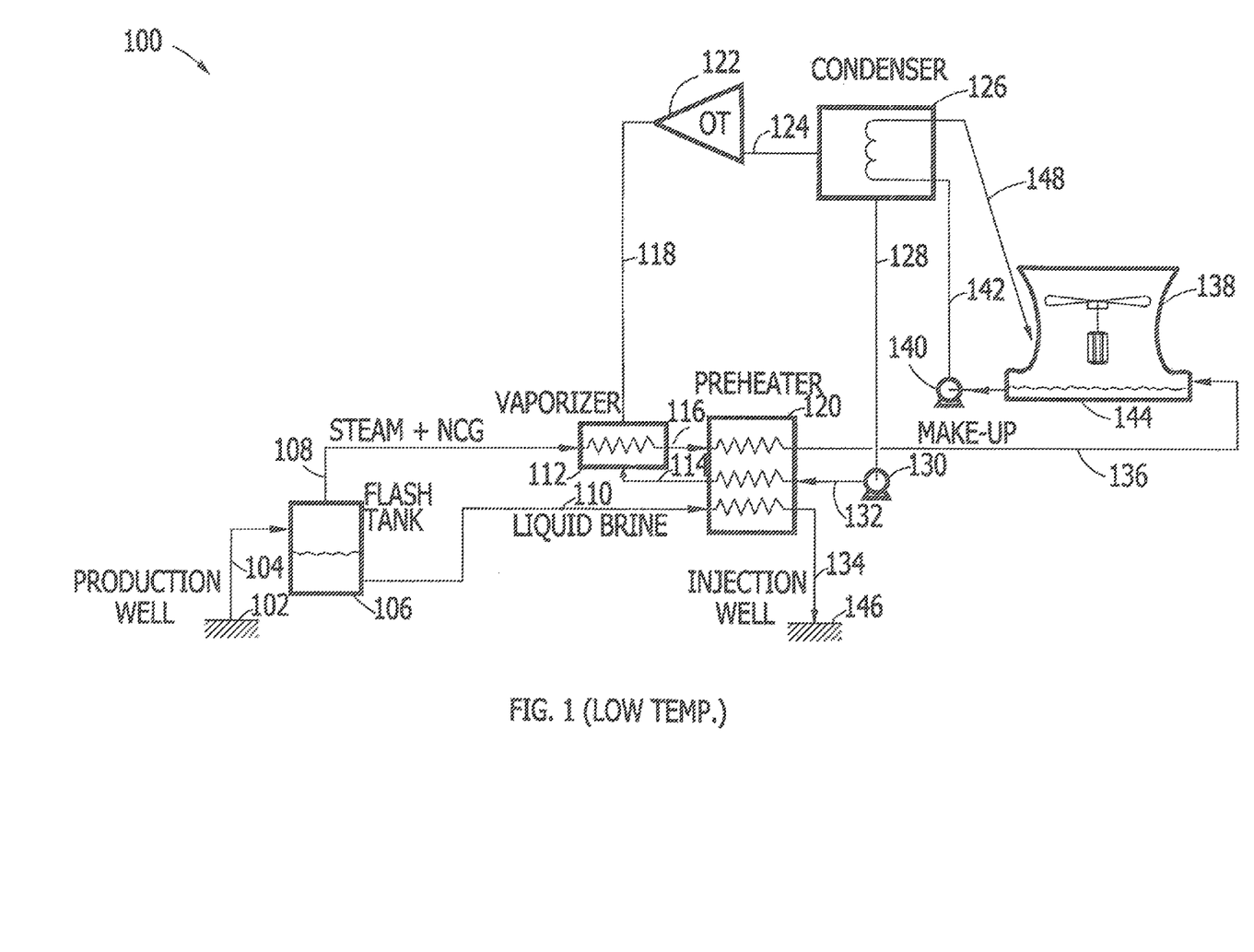
FIG. 1 is a block diagram showing a power plant using geothermal fluid from a production well in accordance with a non-limiting embodiment of the present subject matter.

Turning now to FIG. 1, a power plant according to the present subject matter is designated by the reference numeral 100. Production well 102 produces hot geothermal fluid comprising geothermal vapor and geothermal brine. The hot geothermal fluid is supplied via conduit 104 to flash tank 106. In flash tank 106, the hot geothermal fluid is separated into geothermal vapor comprising geothermal steam and non-condensable gases, which exits flash tank 106 by way of conduit 108, and geothermal brine, which exits flash tank 106 by way of conduit 110. The geothermal vapor in conduit 108 is supplied to vaporizer 112. Vaporizer 112 also receives liquid motive fluid by way of conduit 114. In vaporizer 112, the latent heat present in the geothermal vapor is utilized to vaporize the motive fluid, producing heat-depleted geothermal vapor (or geothermal vapor condensate) exiting vaporizer 112 by way of conduit 116 and vaporized motive fluid exiting vaporizer 112 exiting by way of conduit 118.

In accordance with the present subject matter, flash tank 106 is configured to produce geothermal vapor containing a latent heat content only enough to vaporize the motive fluid in the vaporizer, which has been previously preheated in preheater 120. In the present subject matter, flash tank 106 is configured to produce geothermal vapor with a specific latent heat content. The specific latent heat content is only sufficient enough to vaporize the preheated motive fluid present in vaporizer 112. Thus, the heat found in the geothermal vapor is utilized at an optimal capacity.

The vaporized motive fluid in conduit 118 is supplied to vapor turbine 122 where the vaporized motive fluid is expanded, producing power and expanded vaporized motive fluid. The expanded vaporized motive fluid is then supplied to condenser 126 by way of conduit 124. In condenser 126, the expanded vaporized motive fluid is condensed to form condensed motive fluid in conduit 128. The condensed motive fluid in line 128 is pumped by pump 130 to preheater 120 by way of conduit 132.

In preheater 120, the condensed motive fluid is preheated using sensible heat from the heat-depleted geothermal vapor (or geothermal vapor condensate), which is supplied to preheater 120 by conduit 116, and from the geothermal brine, which is supplied to preheater 120 by conduit 110. The sensible heat from the heat-depleted geothermal vapor (or geothermal vapor condensate) and the geothermal brine heats the condensed motive fluid essentially to its boiling point temperature, thereby producing the preheated motive fluid that is supplied to vaporizer 112 through conduit 114. As the sensible heat is removed from the heat-depleted geothermal vapor (or geothermal vapor condensate), heat-depleted vapor condensate or make-up water is produced. The make-up water is optionally supplied to cooling pond 144 by way of conduit 136. The geothermal brine loses sensible heat in preheater 120 and forms heat-depleted geothermal brine. The heat-depleted geothermal brine is supplied to injection well 146 by conduit 134.

Cooling pond 144 is used in conjunction with cooling tower 138. Cooling pond 144 supplies cooling water to condenser 126. Pump 140 pumps the cooling water to condenser 126 through conduit 142. The cooling water exiting condenser 126 returns to cooling pond 144 by way of conduit 148.

In the non-limiting embodiment of FIG. 1, it is contemplated that the motive fluid is any working fluid capable of being vaporized in vaporizer 112 and being expanded in vapor turbine 122. In a particular aspect, the motive fluid is an organic working fluid and vapor turbine 122 is an organic vapor turbine. Organic working fluids suitable for use in the present subject matter include, without limitation, pentane and isopentane. However, other organic working fluids may also work in the power plant of the present subject matter.

As indicated above, the size and configuration of flash tank 106 will depend on the amount of latent heat that needs to be present in the geothermal vapor. An aspect of the present subject matter is that the amount of latent heat in the geothermal vapor is only enough to vaporize the preheated motive fluid in the vaporizer. A flash tank sized and configured to supply just enough latent heat in the geothermal vapor to vaporize one particular motive fluid may not be a properly sized and configured flash tank to supply just enough latent heat in the geothermal vapor to vaporize a different motive fluid. In other words, a flash tank sized and configured to supply geothermal vapor with just enough latent heat to vaporize n-pentane in a non-limiting example will not be able to supply geothermal vapor with just enough latent heat to vaporize isopentane.

Figure 2:
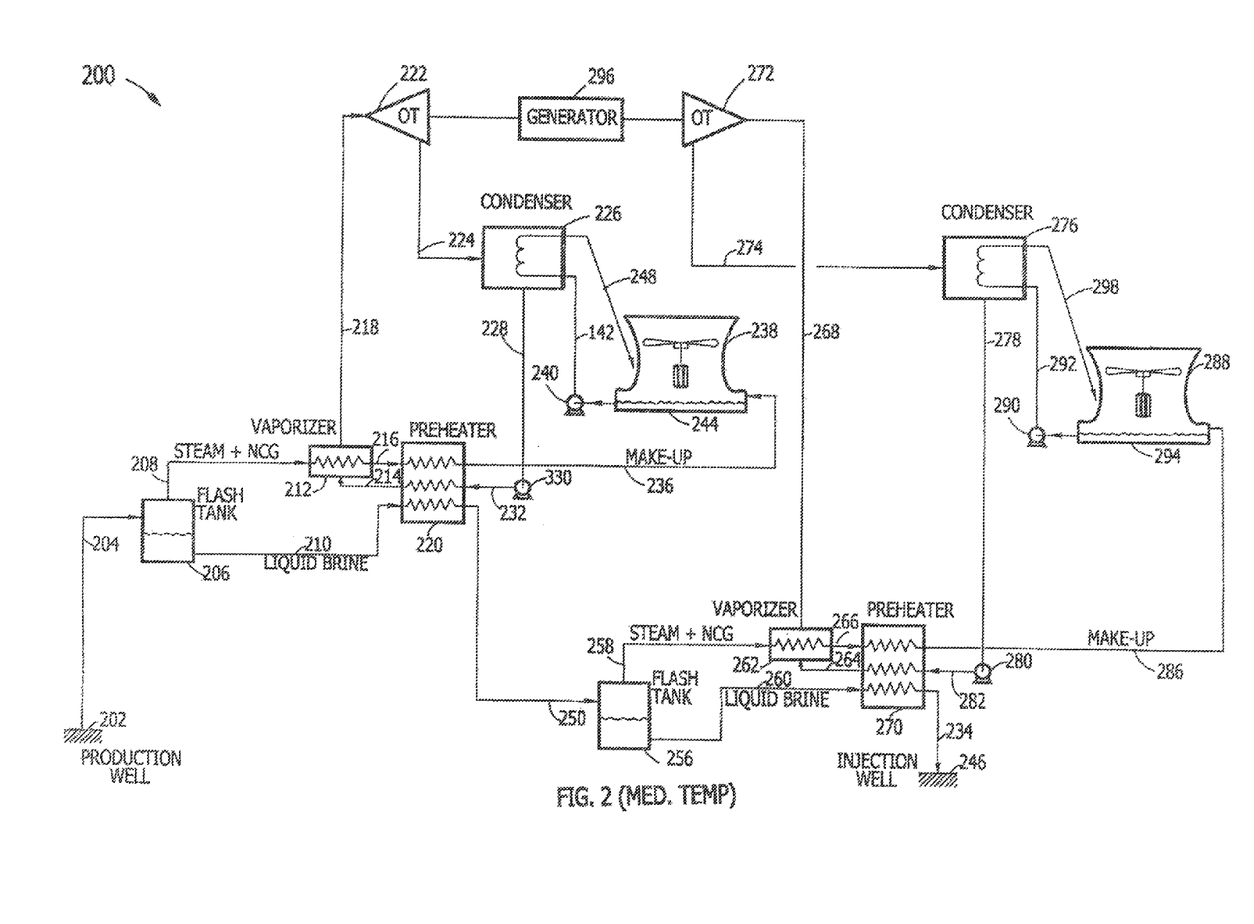
FIG. 2 is a block diagram showing a power plant using geothermal fluid from a production well in accordance with another non-limiting embodiment of the present subject matter.

Turning now to FIG. 2, another power plant according to the present subject matter is designated by the reference numeral 200. Production well 202 produces hot geothermal fluid comprising geothermal vapor and geothermal brine. The hot geothermal fluid is supplied via conduit 204 to first flash tank 206. In first flash tank 206, the hot geothermal fluid is separated into a geothermal vapor comprising geothermal steam and non-condensable gases, which exits first flash tank 206 by way of conduit 208, and geothermal brine, which exits first flash tank 206 by way of conduit 210. The geothermal vapor in conduit 208 is supplied to first vaporizer 212. First vaporizer 212 also receives liquid motive fluid by way of conduit 214. In first vaporizer 212, the latent heat present in the geothermal vapor is utilized to vaporize the motive fluid, producing heat-depleted geothermal vapor (or geothermal vapor condensate) exiting first vaporizer 212 by way of conduit 216 and vaporized motive fluid exiting vaporizer 212 by way of conduit 218.

In accordance with the present subject matter, first flash tank 206 is configured to produce geothermal vapor containing a latent heat content only enough to vaporize the motive fluid in the vaporizer, which has been previously preheated in preheater 220. In the present subject matter, first flash tank 206 is configured to produce geothermal vapor with a specific latent heat content. The specific latent heat content is only sufficient enough to vaporize the preheated motive fluid present in vaporizer 212. Thus, the heat found in the geothermal vapor is utilized at an optimal capacity.

The vaporized motive fluid in conduit 218 is supplied to vapor turbine 222 where the vaporized motive fluid is expanded, producing power and expanded vaporized motive fluid. The expanded vaporized motive fluid is then supplied to condenser 226 by way of conduit 224. In condenser 226, the expanded vaporized motive fluid is condensed to form condensed motive fluid in conduit 228. The condensed motive fluid in line 228 is pumped by pump 230 to preheater 220 by way of conduit 232.

In preheater 220, the condensed motive fluid is preheated using sensible heat from the heat-depleted geothermal vapor (or geothermal vapor condensate), which is supplied to preheater 220 by conduit 216, and from the geothermal brine, which is supplied to preheater 220 by conduit 210. The sensible heat from the heat-depleted geothermal vapor (or geothermal vapor condensate) and the geothermal brine heats the condensed motive fluid to its boiling point temperature, thereby producing the preheated motive fluid that is supplied to vaporizer 212 through conduit 214. As the sensible heat is removed from the heat-depleted geothermal vapor (or geothermal vapor condensate), heat-depleted geothermal vapor condensate or make-up water is produced. The make-up water is optionally supplied to cooling pond 244 by way of conduit 236. The geothermal brine loses sensible heat in preheater 220 and forms heat-depleted geothermal brine.

Cooling pond 244 is used in conjunction with cooling tower 238. Cooling pond 244 supplies cooling water to condenser 226. Pump 240 pumps the cooling water to condenser 226 through conduit 242. The cooling water exiting condenser 226 returns to cooling pond 244 by way of conduit 248.

The heat-depleted geothermal brine exits preheater 220 by way of conduit 250 and is supplied to second flash tank 256. In second flash tank 256, the heat-depleted geothermal brine is separated into a lower-temperature geothermal vapor comprising lower-temperature geothermal steam and non-condensable gases, which exits second flash tank 256 by way of conduit 258, and further heat-depleted geothermal brine, which exits second flash tank 256 by way of conduit 260. The lower temperature geothermal vapor in conduit 258 is supplied to second vaporizer 262. Second vaporizer 262 also receives a second liquid motive fluid by way of conduit 264. In second vaporizer 262, the latent heat present in the lower temperature geothermal vapor is utilized to vaporize the second motive fluid, producing second heat-depleted geothermal vapor (or second geothermal vapor condensate) exiting second vaporizer 262 by way of conduit 266 and vaporized motive fluid exiting vaporizer 212 by way of conduit 218.

In accordance with the present subject matter, second flash tank 256 is configured to produce lower temperature geothermal vapor containing a latent heat content only enough to vaporize the second motive fluid in the second vaporizer, which has been previously preheated in preheater 270. In other words, in the present subject matter, second flash tank 256 is configured to produce lower temperature (and lower pressure) geothermal vapor with a specific latent heat content. The specific latent heat content is only sufficient enough to vaporize the preheated second motive fluid present in vaporizer 262.

The vaporized second motive fluid in conduit 268 is supplied to second vapor turbine 272 where the vaporized second motive fluid is expanded, producing power and expanded second vaporized motive fluid. In the present non-limiting embodiment, vapor turbine 222 is connected to a generator in order to produce power, and second vapor turbine 272 is also connected to a generator to produce power. In an optional aspect of the present subject matter, an output shaft of vapor turbine 222 and an output shaft of second vapor turbine 272 are each connected to generator 296. However, it is also contemplated within the scope of the present subject matter that vapor turbine 222 and second vapor turbine 272 will each have a separate generator used to generate power and will not be connected to the same generator 296.

The expanded vaporized motive fluid is then supplied to second condenser 276 by way of conduit 274. In second condenser 276, the expanded second vaporized motive fluid is condensed to form condensed second motive fluid in conduit 278. The condensed second motive fluid in conduit 278 is pumped by pump 280 to preheater 270 by way of conduit 282.

In second preheater 270, the condensed second motive fluid is preheated using sensible heat from the second heat-depleted geothermal vapor (or geothermal vapor condensate), which is supplied to second preheater 270 by conduit 266, and from the further heat-depleted geothermal brine, which is supplied to second preheater 270 by conduit 260. The sensible heat from the second heat-depleted geothermal vapor (or geothermal vapor condensate) and the further heat-depleted geothermal brine heats the condensed second motive fluid to its boiling point temperature, thereby producing the preheated second motive fluid that is supplied to vaporizer 262 through conduit 264. As the sensible heat is removed from the second heat-depleted geothermal vapor (or geothermal vapor condensate), further heat depleted geothermal vapor condensate or make-up water is produced. The further make-up water is optionally supplied to second cooling pond 294 by way of conduit 286. The further heat-depleted geothermal brine loses sensible heat in second preheater 270 and forms still further heat-depleted geothermal brine.

Thus, the present embodiment can be considered as a two level power plant unit having first vapor turbine 222 operating on high temperature geothermal fluid (high temperature geothermal vapor and NCG's and high geothermal brine) and second vapor turbine 272 operating on lower temperature geothermal fluid (lower temperature geothermal vapor and NCG's and lower geothermal brine). Furthermore, if the vapor turbine 222 and vapor turbine 272 run a common electric generator e.g. electric generator 296, the power plant can be considered as an integrated two level power plant unit.

In an alternative configuration, the heat depleted brine exiting first flash tank 206 can be supplied directly in series to second flash tank 256 rather than supplying it first of all to the first preheater. Thereafter, the further heat depleted brine exiting second flash tank 256 can be supplied to both first and second preheaters in parallel in accordance with U.S. Pat. Nos. 4,578,953, 4,700,543, 5,531,073 and U.S. patent application Ser. No. 13/190,148, the disclosures of which are hereby incorporated by reference.

Second cooling pond 294 is used in conjunction with second cooling tower 288. Second cooling pond 294 supplies cooling water to second condenser 276. Pump 290 pumps the cooling water to second condenser 276 through conduit 292. The cooling water exiting second condenser 276 returns to second cooling pond 294 by way of conduit 298.

While the non-limiting embodiment of FIG. 2 shows two cooling ponds and two cooling towers for receiving the make-up water and further make-up water, respectively, and for supplying cooling water to condenser 226 and second condenser 276, respectively, it is also contemplated that only one cooling pond and cooling tower can be used. In such an embodiment, the single cooling pond supplies cooling water to both condensers and receives all of the make-up water.

Further, in the non-limiting embodiment of FIG. 2, it is contemplated that the motive fluid is any working fluid capable of being vaporized in vaporizer 212 and second vaporizer 262, and being expanded in vapor turbine 222 and second vapor turbine 272. In a particular aspect, the motive fluid is an organic working fluid and the vapor turbines 222, 272 are organic vapor turbines. Organic working fluids suitable for use in the present subject matter include, without limitation, pentane and isopentane. However, other organic working fluids may also work in the power plant of the present subject matter.

As indicated above, the size and configuration of each flash tank 206, 256 will depend on the amount of latent heat that needs to be present in the respective geothermal vapor. An aspect of the present subject matter is that the amount of latent heat in the respective geothermal vapor is only enough to vaporize the respective preheated motive fluid in the particular vaporizer. A flash tank sized and configured to supply just enough latent heat in the geothermal vapor to vaporize one particular motive fluid may not be a properly sized and configured flash tank to supply just enough latent heat in the geothermal vapor to vaporize a different motive fluid. In other words, a flash tank sized and configured to supply geothermal vapor with just enough latent heat to vaporize n-pentane in a non-limiting example will not be able to supply geothermal vapor with just enough latent heat to vaporize isopentane.

Figure 3:
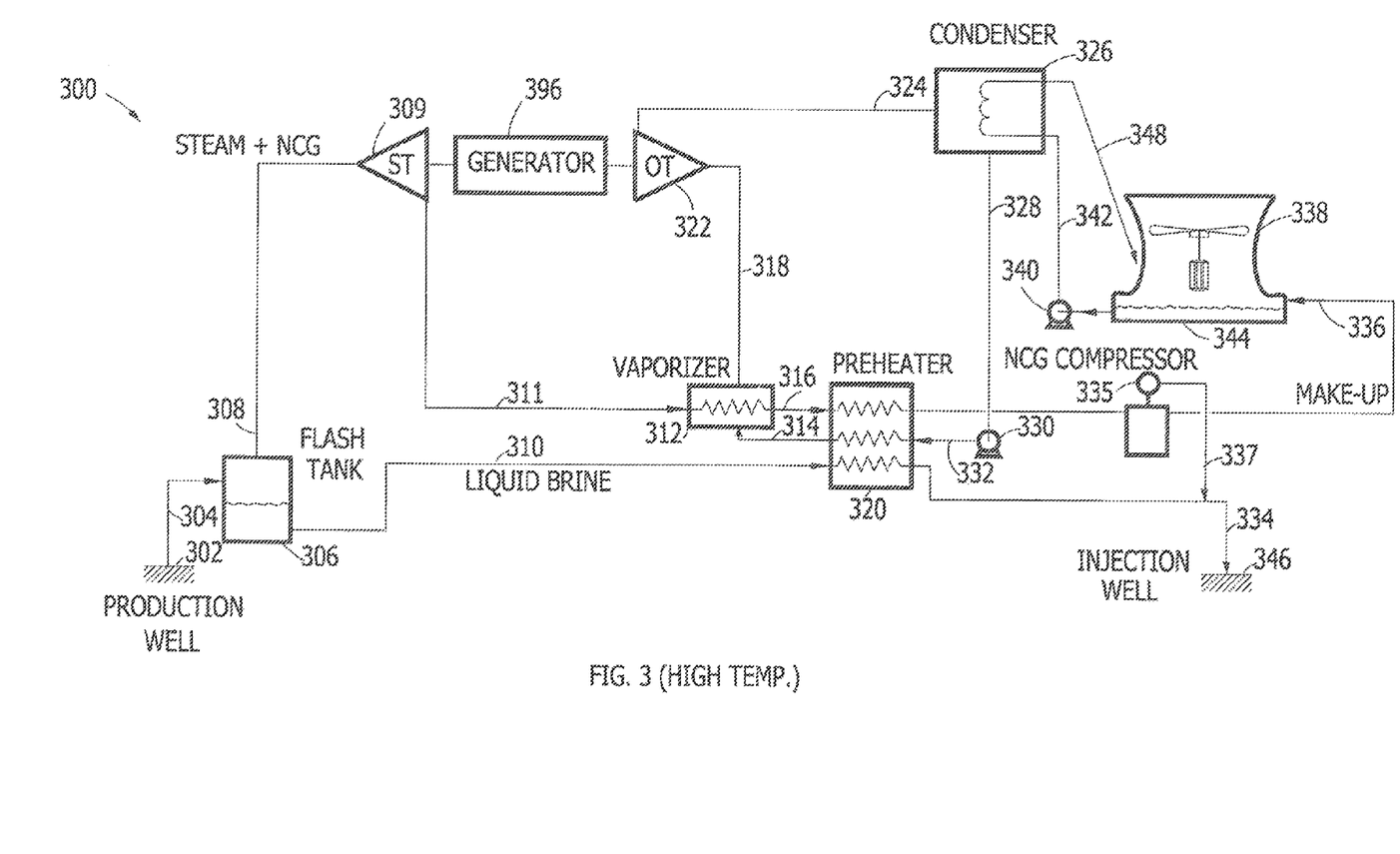
FIG. 3. is a block diagram showing a power plant using geothermal fluid from a production well in accordance with a further non-limiting embodiment of the present subject matter.

A further power plant according to the present subject matter is designated by the reference numeral 300 in FIG. 3. Production well 302 produces hot geothermal fluid comprising geothermal vapor and geothermal brine. In this embodiment, the hot geothermal fluid produced by production well 302 has a higher temperature and a greater amount of latent heat than the hot geothermal fluid produced in the production wells discussed above with respect to FIGS. 1 and 2. The hot geothermal fluid is supplied via conduit 304 to flash tank 306. In flash tank 306, the hot geothermal fluid is separated into a geothermal vapor comprising geothermal steam and non-condensable gases, which exits flash tank 306 by way of conduit 308, and geothermal brine, which exits flash tank 306 by way of conduit 310. The geothermal vapor in conduit 308 is supplied to steam turbine 309 connected to generator 396, where the geothermal vapor is expanded, producing power and expanded geothermal vapor. Expanded geothermal vapor is supplied to vaporizer 312 by way of conduit 311. Vaporizer 312 also receives liquid motive fluid by way of conduit 314. In vaporizer 312, the latent heat present in the expanded geothermal vapor is utilized to vaporize the motive fluid, producing heat-depleted geothermal vapor (or geothermal vapor condensate) exiting vaporizer 312 by way of conduit 316 and vaporized motive fluid exiting vaporizer 312 by way of conduit 318.

In accordance with the present subject matter, flash tank 306 is configured to produce geothermal vapor containing a large amount of latent and sensible heat. Steam turbine 309 is configured to expand the geothermal vapor to produce expanded geothermal vapor containing a latent heat content essentially only enough to vaporize the motive fluid in the vaporizer, which has been previously preheated in preheater 320. In other words, steam turbine 309 removes heat and pressure from the geothermal vapor exiting flash tank 306 and steam turbine is configured to remove essentially just enough heat and pressure from the geothermal vapor that the remaining latent heat present in the expanded geothermal vapor is essentially just enough to vaporize the preheated liquid motive fluid present in vaporizer 312. In the present embodiment, flash tank 306 and steam turbine 309 work in conjunction and are configured to produce expanded geothermal vapor with a specific latent heat content. The specific latent heat content is essentially only sufficient enough to vaporize the preheated motive fluid present in vaporizer 312.

The vaporized motive fluid in conduit 318 is supplied to vapor turbine 322 connected to generator 396, where the vaporized motive fluid is expanded, thereby producing power and expanded vaporized motive fluid. The expanded vaporized motive fluid is then supplied to condenser 326 by way of conduit 324. In condenser 326, the expanded vaporized motive fluid is condensed to form condensed motive fluid in conduit 328. The condensed motive fluid in conduit 328 is pumped by pump 330 to preheater 320 by way of conduit 332.

In preheater 320, the condensed motive fluid is preheated using heat from the heat depleted geothermal vapor (or geothermal vapor condensate), which is supplied to preheater 320 by conduit 316, and sensible heat from the geothermal brine, which is supplied to preheater 320 by conduit 310. The heat from the heat-depleted geothermal vapor (or geothermal vapor condensate) and the sensible heat from the geothermal brine heats the condensed motive fluid to essentially its boiling point temperature, thereby producing the preheated motive fluid that is supplied to vaporizer 312 through conduit 314.

As the heat is removed from the heat-depleted geothermal vapor (or geothermal vapor condensate), further heat-depleted geothermal vapor is produced. Compressor 335 compresses the non-condensable gases present vaporizer 320 and/or preheater 320 if necessary. The compressed non-condensable gases are fed to conduit 334 by way of conduit 337, where they are mixed with the heat-depleted geothermal brine exiting preheater 320. The further heat depleted geothermal vapor condensate or make-up water present is optionally supplied to cooling pond 344 by way of conduit 336. The geothermal brine loses sensible heat in preheater 320 and forms heat-depleted geothermal brine. The heat-depleted brine and compressed non-condensable gases are supplied to injection well 346 by conduit 334.

Cooling pond 344 is used in conjunction with cooling tower 338. Cooling pond 344 supplies cooling water to condenser 326. Pump 340 pumps the cooling water to condenser 326 through conduit 342. The cooling water exiting condenser 326 returns to cooling pond 344 by way of conduit 348.

In the non-limiting embodiment of FIG. 3, it is contemplated that the motive fluid is any working fluid capable of being vaporized in vaporizer 312 and being expanded in vapor turbine 322. In a particular aspect, the motive fluid is an organic working fluid and vapor turbine 322 is an organic vapor turbine. Organic working fluids suitable for use in the present subject matter include, without limitation, pentane and isopentane. However, other organic working fluids may also work in the power plant of the present subject matter.

As indicated above, the size and configuration of flash tank 306 and steam turbine 309 will depend on the amount of latent heat that needs to be present in the expanded geothermal vapor. An aspect of the present subject matter is that the amount of latent heat in the expanded geothermal vapor is only enough to vaporize the preheated motive fluid in the vaporizer. A flash tank and steam turbine sized and configured to remove just enough sensible heat and supply just enough latent heat in the expanded geothermal vapor to vaporize one particular motive fluid may not be a properly sized and configured flash tank to supply just enough latent heat in the expanded geothermal vapor to vaporize a different motive fluid.

In the non-limiting embodiment depicted in FIG. 3, vapor turbine 322 is connected to a generator in order to produce power, and steam turbine 309 is also connected to a generator to produce power. In an optional aspect of this embodiment, an output shaft of vapor turbine 322 and an output shaft of steam turbine 309 are each connected to generator 396. However, it is also contemplated within the scope of the present subject matter that vapor turbine 322 and steam turbine 309 will each have a separate generator used to generate power and will not be connected to the same generator 396.

Figure 4:
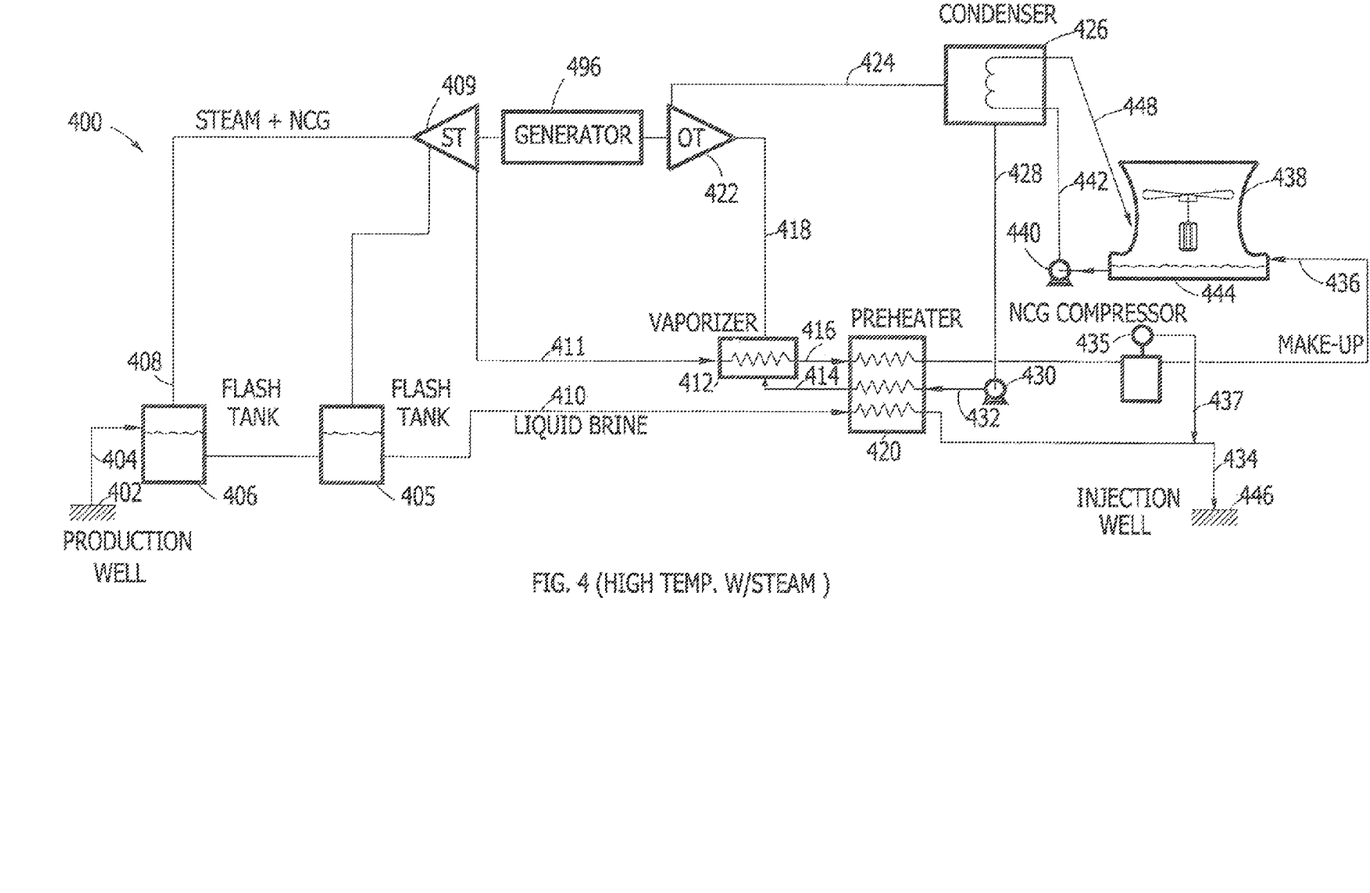
FIG. 4 is a block diagram showing a power plant using geothermal fluid from a production well in accordance with a still further non-limiting embodiment of the present subject matter.

Another power plant according to the present subject matter is designated by the reference numeral 400 in FIG. 4. Production well 402 produces hot geothermal fluid comprising geothermal vapor and geothermal brine. In this embodiment, the hot geothermal fluid produced by production well 402 has a higher temperature, a greater amount of geothermal steam and a greater amount of latent heat than the hot geothermal fluid produced in the production wells discussed above with respect to FIGS. 1-3. The hot geothermal fluid is supplied via conduit 404 to first flash tank 406. In first flash tank 406, the hot geothermal fluid is separated into a geothermal vapor comprising geothermal steam and non-condensable gases, which exits first flash tank 406 by way of conduit 408, and geothermal brine, which exits flash tank 406 by way of conduit 407. The geothermal vapor in conduit 408 is supplied to steam turbine 409 connected to generator 496, where the geothermal vapor is expanded, producing power and expanded geothermal vapor. Steam turbine 409 comprises multiple stages for expanding geothermal steam at various pressures and temperatures.

The geothermal brine in conduit 407 is supplied to second flash tank 405, where the geothermal brine is separated into lower-temperature geothermal vapor exiting second flash tank 405 by way of conduit 403 and further geothermal brine exiting second flash tank 405 by way of conduit 410. The lower-temperature geothermal vapor comprises lower-temperature geothermal steam and non-condensable gases at temperatures and pressures lower than the geothermal vapor exiting first flash tank 406 in conduit 408. The lower-temperature geothermal vapor in conduit 403 is supplied to an intermediate stage of multi-stage steam turbine 409, where the lower-temperature geothermal vapor is also expanded, producing power and expanded geothermal vapor.

Expanded geothermal vapor is supplied to vaporizer 412 by way of conduit 411. Vaporizer 412 also receives liquid motive fluid by way of conduit 414. In vaporizer 412, the latent heat present in the expanded geothermal vapor is utilized to vaporize the motive fluid, producing heat-depleted geothermal vapor (or geothermal vapor condensate) exiting vaporizer 412 by way of conduit 416 and vaporized motive fluid exiting vaporizer 412 by way of conduit 418.

In accordance with the present subject matter, first flash tank 406 is configured to produce geothermal vapor containing a large amount of latent and heat. In addition, second flash tank 405 is configured to produce lower-temperature geothermal vapor containing a lesser amount of latent and heat than is present in the geothermal vapor exiting first flash tank 406. Steam turbine 409 is a multi-stage turbine and is configured to expand the respective geothermal vapors to produce expanded geothermal vapor containing a latent heat content essentially only enough to vaporize the motive fluid in the vaporizer, which has been previously preheated in preheater 420. In other words, steam turbine 409 removes heat and pressure from the respective geothermal vapors exiting first flash tank 406 and second flash tank 405 and steam turbine 409 is configured to remove essentially just enough heat and pressure from the geothermal vapors that the remaining latent heat present in the expanded geothermal vapor is essentially just enough to vaporize the preheated liquid motive fluid present in vaporizer 412. In the present embodiment, first flash tank 406, second flash tank 405 and steam turbine 409 work in conjunction and are configured to produce expanded geothermal vapor with a specific latent heat content. The specific latent heat content is essentially only sufficient enough to vaporize the preheated motive fluid present in vaporizer 412.

The vaporized motive fluid in conduit 418 is supplied to vapor turbine 422 connected to generator 496, where the vaporized motive fluid is expanded, thereby producing power and expanded vaporized motive fluid. The expanded vaporized motive fluid is then supplied to condenser 426 by way of conduit 424. In condenser 426, the expanded vaporized motive fluid is condensed to form condensed motive fluid in conduit 428. The condensed motive fluid in conduit 428 is pumped by pump 430 to preheater 420 by way of conduit 432.

In preheater 420, the condensed motive fluid is preheated using heat from the heat depleted geothermal vapor (or geothermal vapor condensate), which is supplied to preheater 420 by conduit 416, and sensible from the further geothermal brine, which is supplied to preheater 420 by conduit 410. The heat from the heat-depleted geothermal vapor (or geothermal vapor condensate) and the sensible heat from the further geothermal brine heats the condensed motive fluid to its boiling point temperature, thereby producing the preheated motive fluid that is supplied to vaporizer 412 through conduit 414.

As the heat is removed from the heat-depleted geothermal vapor (or geothermal vapor condensate), further heat-depleted geothermal vapor (or geothermal vapor condensate) is produced. Compressor 335 compresses the non-condensable gases present in vaporizer 412 or present in preheater 420, if necessary. The compressed non-condensable gases are fed to conduit 434 by way of conduit 437, where they are mixed with the heat-depleted geothermal brine exiting preheater 420. The make-up water (or further heat depleted geothermal vapor condensate) present after the non-condensable gases are compressed and removed is optionally supplied to cooling pond 444 by way of conduit 436. The geothermal brine loses sensible heat in preheater 420 and forms heat-depleted geothermal brine. The heat-depleted brine and compressed non-condensable gases are supplied to injection well 446 by conduit 434.

Cooling pond 444 is used in conjunction with cooling tower 438. Cooling pond 444 supplies cooling water to condenser 426. Pump 440 pumps the cooling water to condenser 426 through conduit 442. The cooling water exiting condenser 426 returns to cooling pond 444 by way of conduit 448.

In the non-limiting embodiment of FIG. 4, it is contemplated that the motive fluid is any working fluid capable of being vaporized in vaporizer 412 and being expanded in vapor turbine 422. In a particular aspect, the motive fluid is an organic working fluid and vapor turbine 422 is an organic vapor turbine. Organic working fluids suitable for use in the present subject matter include, without limitation, pentane and isopentane. However, other organic working fluids may also work in the power plant of the present subject matter.

As indicated above, the size and configuration of first flash tank 406, second flash tank 405 and steam turbine 409 will depend on the amount of latent heat that needs to be present in the expanded geothermal vapor. An aspect of the present subject matter is that the amount of latent heat in the expanded geothermal vapor is only enough to vaporize the preheated motive fluid in the vaporizer. Flash tanks and steam turbine sized and configured to remove just enough sensible heat and supply just enough latent heat in the expanded geothermal vapor to vaporize one particular motive fluid may not be a properly sized and configured flash tank to supply just enough latent heat in the expanded geothermal vapor to vaporize a different motive fluid.

In the non-limiting embodiment depicted in FIG. 4, vapor turbine 422 is connected to a generator in order to produce power, and steam turbine 409 is also connected to a generator to produce power. In an optional aspect of this embodiment, an output shaft of vapor turbine 422 and an output shaft of steam turbine 409 are each connected to generator 496. However, it is also contemplated within the scope of the present subject matter that vapor turbine 422 and steam turbine 409 will each have a separate generator used to generate power and will not be connected to the same generator 496.

Examples of temperatures and pressures applicable to the embodiments described above are as follows:

Steam exits separator 106 at about 180° C. and a pressure of about 9.5 bara while the separated geothermal brine exits separator 106 at about 180° C. and a pressure of about 10 bara in the embodiment described with reference to FIG. 1.

Steam exits first separator 206 at about 170° C. and a pressure of about 7.75 bara while the separated geothermal brine exits first separator 206 at about 170° C. and a pressure of about 8 bara in the embodiment described with reference to FIG. 2. On the other hand, steam exits second separator 256 at about 115° C. and a pressure of about 1.7 bara while the separated geothermal brine exits second separator 256 at about 115° C. and a pressure of about 1.7 bara in the embodiment described with reference to FIG. 2.

Turning to FIG. 3, steam exits separator 306 at about 205° C. and a pressure of about 18 bara and is supplied to the steam turbine. On the other hand, the separated geothermal brine exits separator 306 at about 180° C. and a pressure of about 10 bara in the embodiment described with reference to FIG. 3.

Turning to FIG. 4, steam exits first separator 406 at about 221° C. and a pressure of about 23.5 bara and is supplied to the steam turbine. On the other hand, steam exits second separator 405 at about 125° C. and a pressure of about 2.3 bara while the separated geothermal brine exits second separator 405 at about 125° C. and a pressure of about 2.3 bara in the embodiment described with reference to FIG. 4.

While the present invention describes embodiments where the heat depleted geothermal vapor condensate can be used as make-up water for a cooling tower, the heat depleted geothermal vapor condensate could be used, according to the present invention as make-up water for an air cooled condenser wherein water is evaporated to evaporatively cool the air supplied to the air cooled condenser. Furthermore, the present invention, if advantageous, could be used with an air cooled condenser without evaporative cooling. In such a case, the heat depleted geothermal vapor condensate could be added to the geothermal brine prior to supplying it the preheater.

Therefore, it will be understood that many additional changes in the details, materials, steps and arrangement of parts, which have been herein described and illustrated to explain the nature of the disclosure, may be made by those skilled in the art within the principal and scope of the disclosure as expressed in the appended claims.

What is claimed is:

1. A method for producing power from geothermal fluid containing non-condensable gases produced by a geothermal production well, the method comprising:
    separating said geothermal fluid in a flash tank into geothermal vapor comprising steam and non-condensable gases, and geothermal brine;
    supplying said geothermal vapor to a vaporizer;
    vaporizing a preheated first motive fluid in the vaporizer using heat from said geothermal vapor to produce geothermal vapor condensate and vaporized first motive fluid, wherein the heat content in the geothermal vapor exiting said flash tank is only enough to vaporize said preheated first motive fluid in the vaporizer;

expanding said vaporized first motive fluid in a vapor turbine producing power and expanded vaporized first motive fluid;

condensing said expanded vaporized first motive fluid in a condenser to produce condensed first motive fluid; and preheating said condensed first motive fluid in a preheater using heat from said geothermal vapor condensate, thereby producing said preheated first motive fluid and heat depleted geothermal vapor condensate;

wherein said first motive fluid is an organic fluid;

separating said geothermal brine in a second flash tank into lower-temperature geothermal vapor comprising lower-temperature steam and non-condensable gases, and heat-depleted geothermal brine;

supplying said lower-temperature geothermal vapor to a second vaporizer;

vaporizing a preheated second motive fluid in the second vaporizer using heat from said lower-temperature geothermal vapor to produce second geothermal vapor condensate and vaporized second motive fluid, wherein the heat content in the lower-temperature geothermal vapor exiting said second flash tank is only enough to vaporize said preheated second motive fluid in the second vaporizer;

expanding said vaporized second motive fluid in a second vapor turbine producing power and expanded second vaporized motive fluid;

condensing said expanded second vaporized motive fluid in a second condenser to produce condensed second motive fluid; and preheating said condensed second motive fluid in a second preheater using heat from said second geothermal vapor condensate and said heat-depleted geothermal brine, thereby producing said preheated second motive fluid, further heat depleted geothermal vapor condensate and further heat-depleted geothermal brine;

wherein said second motive fluid is an organic fluid; and wherein said heat-depleted geothermal brine is supplied to said preheater for preheating said condensed motive fluid using heat from said heat depleted geothermal brine in addition to heat from said geothermal vapor condensate, thereby producing said preheated motive fluid and further heat depleted geothermal brine.

2. The method of claim 1, further comprising providing a single generator connected to output shafts from said vapor turbine and said second vapor turbine to produce power.

3. The method according to claim 1 wherein said further heat-depleted geothermal brine is supplied to an injection well.

4. A method for producing power from geothermal fluid containing non-condensable gases produced by a geothermal production well, the method comprising:

separating said geothermal fluid in a flash tank into geothermal vapor comprising steam and non-condensable gases, and geothermal brine;

supplying said geothermal vapor to a vaporizer;

vaporizing a preheated first motive fluid in the vaporizer using heat from said geothermal vapor to produce geothermal vapor condensate and vaporized first motive fluid, wherein the heat content in the geothermal vapor exiting said flash tank is only enough to vaporize said preheated first motive fluid in the vaporizer;

expanding said vaporized first motive fluid in a vapor turbine producing power and expanded vaporized first motive fluid;

condensing said expanded vaporized first motive fluid in a condenser to produce condensed first motive fluid; and preheating said condensed first motive fluid in a preheater using heat from said geothermal vapor condensate and said geothermal brine, thereby producing said preheated first motive fluid, make-up water and heat-depleted geothermal brine;

separating said heat-depleted geothermal brine in a second flash tank into lower-temperature geothermal vapor comprising lower-temperature steam and non-condensable gases, and further heat-depleted geothermal brine;

supplying said lower-temperature geothermal vapor to a second vaporizer;

vaporizing a preheated second motive fluid in the second vaporizer using heat from said lower-temperature geothermal vapor to produce second geothermal vapor condensate and vaporized second motive fluid, wherein the heat content in the lower-temperature geothermal vapor exiting said second flash tank is only enough to vaporize said preheated second motive fluid in the second vaporizer;

expanding said vaporized second motive fluid in a second vapor turbine producing power and expanded second vaporized motive fluid;

condensing said expanded second vaporized motive fluid in a second condenser to produce condensed second motive fluid; and preheating said condensed second motive fluid in a second preheater using heat from said second geothermal vapor condensate and said further heat-depleted geothermal brine, thereby producing said preheated second motive fluid, further make-up water and still further heat-depleted geothermal brine;

wherein said first motive fluid and said second motive fluid are an organic fluid.

5. The method of claim 4, further comprising supplying said make-up water to a cooling pond.

6. The method of claim 4, further comprising supplying cooling water from a cooling pond to said condenser.

7. The method of claim 4, wherein said first motive fluid and said second motive fluid comprise different motive fluids.

8. The method of claim 4, wherein said first motive fluid and said second motive fluids comprise the same fluid.

9. The method of claim 4, further comprising supplying said make-up water to a first cooling pond and said further make-up water to a second cooling pond.

10. The method of claim 4, further comprising supplying said make-up water and said further make-up water to a cooling pond.

11. The method of claim 4, further comprising:

supplying cooling water from a first cooling pond to said condenser; and supplying further cooling water from a second cooling pond to said second condenser.

12. The method of claim 4, further comprising providing a single generator connected to output shafts from said vapor turbine and said second vapor turbine to produce power.

* * * * *